May 8, 1962　　　M. F. WILHELMI　　　3,032,911
ARTIFICIAL FISHING LURE
Filed June 18, 1958
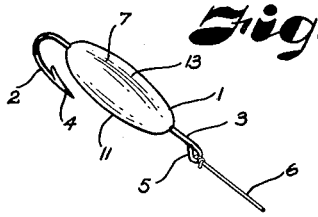
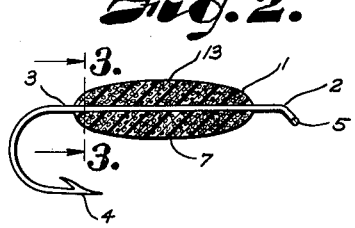
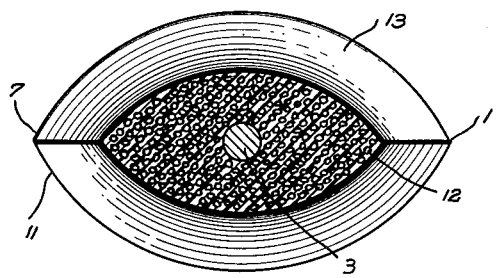
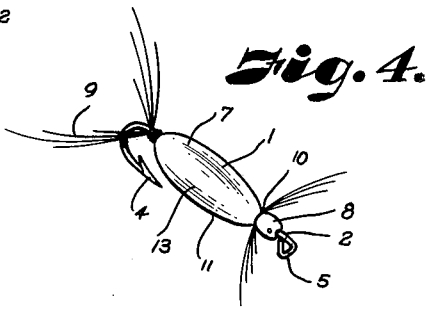
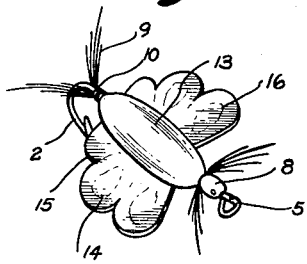
INVENTOR.
Max F. Wilhelmi.
BY
Fishburn and Gold
ATTORNEYS.

3,032,911
ARTIFICIAL FISHING LURE
Max F. Wilhelmi, 804 Massachusetts Ave.,
Lawrence, Kans.
Filed June 18, 1958, Ser. No. 742,938
1 Claim. (Cl. 43—42.37)

This invention relates to artificial fishing lures, and more particularly to fish hooks having buoyant bodies molded on the shank thereof to provide dry flies and other fishing lures which float on the surface of the water to simulate the appearance of insects and other fish foods.

The dry flies currently in use are usually constructed from weaving and tying horsehair, feathers and other related materials together to form a body with appendages simulating wings and legs. The horsehair and feathers are then coated with an oily material to waterproof the same. The oil film on the horsehair and feathers keeps the fly dry and causes it to have a tendency to be buoyant so long as the hook is not roughed up or immersed in the water. When a fish is caught, the lure is, of course, pulled under the water and roughed up which causes the lure to be wet and lose its buoyancy. The wet lure will no longer float properly until it is removed from the line, dried and re-oiled, and this is a constant source of annoyance to fishermen. Numerous structures have been tried in attempting to provide buoyant means that would serve as a fish lure that would not lose its buoyant effect upon being pulled under the water by a fish. The unsuccessfulness of these attempts is clearly shown by the continued use of flies constructed from horsehair and feathers. Different types of structures were used, such as a rubber envelope mounted on the shank of the hook which was filled with air, or a ball of wood or the like mounted on the shank, but the buoyant portions have been excessively large for many "dry flies" and in some instances the buoyancy was lost due to leakage of air or absorption of water over a period of time, and with rubber products or the like there apparently was an odor which was unsuitable.

The principal objects of the present invention are to provide a combined hook and body member which will float and is adaptable for simulating a wide variety of fly type fish lures; to provide a buoyant float member formed on and adhered to the shank of a hook suitable for fly fishing; to provide such a buoyant body which is substantially odorless; to provide such a buoyant body formed on the shank of a fish hook that is composed of a thermosetting plastic and has discrete cells or voids with no opening into the adjoining cells; to provide such a buoyant member formed on the shank of a fishing hook and shaped like the body portion of an insect; to provide such a buoyant member having a relatively tough, water-impervious skin; to provide such a buoyant body formed on the shank of a fish hook with sufficient space between the ends of the body and the respective ends of the shank to further mount additional material such as hackles of horsehair or feathers; to provide a body member of suitable size which has sufficient buoyancy to easily float the fish hook; and to provide a buoyant body mounted on the shank of a fish hook which is economical to manufacture and durable in use.

In accomplishing these and other objects of the present invention, I have provided improved details of structure, the preferred forms of which are illustrated in the accompanying drawings, wherein:

FIG. 1 is a perspective view of a buoyant fish fly embodying the present invention.

FIG. 2 is a longitudinal sectional view through the fish hook and buoyant body.

FIG. 3 is an enlarged transverse sectional view through the hook shank and body taken on the line 3—3, FIG. 2.

FIG. 4 is a perspective view of a buoyant float fly with horsehair or the like to give the appearance of an insect.

FIG. 5 is a perspective view of a modified form showing wings formed integrally with the buoyant body.

Referring more in detail to the drawings:

1 designates a buoyant float fly for fishing having a relatively small fish hook 2 suitable for fly fishing. The fish hook 2 has the usual shank 3 with a hook portion 4 formed at one end and an eye 5 at the other end for securing the same to the end of a fish line 6.

A buoyant body 7 is secured on the shank 3, and preferably is spaced respectively from the hook portion 4 and eye 5, with a head 8 and hackles 9 of horsehair or feathers added thereto, as at 10, to give the appearance of an insect attractive to fish. The hackles 9 and the head 8 may be any of a wide variety of design and arrangement to simulate fly type lures or other float type fishing lures. The shank 3 extends longitudinally and substantially axially in a preferably oval-shaped body 7 as shown in FIG. 3. The body 7 has laterally extending side portions 11 whereby the width of the body is greater than the depth, said side portions extending substantially at right angles to the downwardly extending hook portion 4. The body 7 is preferably elliptical in cross section with the major axis substantially in a horizontal plane with the hook portion 4 in a vertical plane. The elongate body 7 being spaced between the eye 5 and the hook portion 4 floats the fish hook with the shank 3 being substantially coplanar with the surface of the water. The weight of the hook portion 4 tends to position the lure in the water with the hook portion 4 extending downwardly, and the lateral side portions 11 of the body aid in displacing a volume of water equal to the weight of the lure with a relatively small portion of the lure being immersed in the water. The body side portions 11 also stabilize the lure in the water with the hook portion in the proper downward position, whereby the hook portion 4 is in an advantageous position to catch a fish striking at the lure. Although the buoyant body 7 may be molded in any desired design or shape by using a mold having suitably shaped cavities, it is preferable that the body 7 have side portions 11, and that they be at substantially right angles to the plane through the shank 3 and hook portion 4 to stabilize the lure in a proper position.

The buoyant body 7 is preferably cellular having discrete individual voids 12 dispersed therethrough having no opening into the adjacent voids, and has a relatively tough, water-impervious skin 13 forming the entire outer surface of the buoyant member 7.

A slightly modified form of my invention is shown in FIG. 5, and has a buoyant body 7 as in the preferred form of my invention, and has wings 14 formed integrally with the body 7 with uneven edges 15 to simulate the appearance of insect wings. The wings 14 extend generally in opposite directions, preferably in a plane through the shank 3 of the fish hook 2 to give the lure additional stability. The wings 14 may be any of a wide variety of designs and arrangements, and may extend laterally at various angles to the body portion 7, but it is preferable that the portions of the wings 14 adjacent the body portion be at an angle substantially 90 degrees with the plane through the shank 3 and the hook portion 4. The outer portions of the wings 14 may be curved upwardly if desired to provide further variations in the shape thereof. The wings 14 and body 7 may be marked as at 16, by suitable means such as painting, to further simulate the appearance of an insect.

The buoyant body 7 preferably is composed of a thermoplastic resin which may be one of a number of different polymerized ersins having suitable characteristics. The thermoplastic material is combined with a suitable blowing agent, with both the resin and the blowing agent preferably being in powdered form such that they may be thoroughly mixed by grinding or milling the same. However, it is obvious that the thermoplastic resin and blowing agent could be shredded, granular or paste form. A number of different thermoplastic resins and blowing agents are suitable, and the important characteristics of the expanded resin are that the cells therein be individual voids to prevent absorption of water by the same, that the material expand into intimate contact with and adhere to the shank of the hook after expansion, that the expanded material be substantially colorless and odorless, and that the buoyant body have a relatively smooth, tough outer surface which is substantially water impervious. Polyethylene and polypropylene are examples of suitable polymers which may be combined with a suitable blowing agent, such as ammonium carbonate or sodium bicarbonate. Another suitable material is partially pre-expanded pellets of polystyrene which is known as a "foaming in place" material and does not need an independent foaming agent. Due to the many possible variations in the sizze and shape of the buoyant body 7 and the weight of the fish hook 2, the weight of the expanded thermoplastic material used for a particular lure may vary from at light as possible, such as 2 or 3 pounds per cubic foot, up to a maximum of 20 pounds per cubic foot.

A specific example of a suitable mixture would be powdered ammonium carbonate thoroughly grounded and mixed with an ethylene polymer having a molecular weight of approximately 17,000, in proportions of four parts by weight of polymer to one part by weight of carbonate. Sufficient quantity of the mixed material is then placed in a suitable mold cavity, to equal approximately ⅙ to ¼ of the volume of the total cavity, which when closed and heated to approximately 170 degrees C. will effect decomposition of the ammonium carbonate to release gas and thereby expand the polyethylene to fill the cavity of the mold. Then upon cooling of the mold, the thermoplastic material will have a relatively tough outer skin that is substantially impervious, surrounding a cellular center.

In making a buoyant fish lure having a thermoplastic buoyant body as heretofore described, a suitable thermoplastic polymer is thoroughly mixed with a suitable blowing agent. The fish hook 2 and the mixture is then placed in a suitable mold cavity relative to the amount of expansion expected by the mixture so that upon expansion the entire cavity space is filled. The mold is then heated to the temperature at which the blowing agent decomposes, with the polymer softening or preferably melting at said temperature. After allowing sufficient time for expansion of the polymer, the mold is cooled to solidify the polymer in its expanded spongy or cellular form. The mold is then opened and the fish hook 2 having a buoyant body 7 thereon is removed for further cooling. A head 8 and hackles 9 of horsehair or feathers are then tied on the ends of the body 7 in any manner desired to create the appearance of an insect having wings, legs and other appendages.

It is to be understood that while I have illustrated and described certain forms of my invention, it is not to be limited to the specific forms or arrangements of parts herein described and shown except insofar as such limitations are included in the claim.

What I claim and desire to secure by Letters Patent is:

A floating fly type fishing lure of the character described comprising, a fish hook of relatively small size and having a shank with an eye at one end and a hook portion at the other end, a buoyant unitary body shaped similar to the body of an insect in intimate contact with and adhered to said shank and being spaced from the ends of the shank, said shank extending longitudinally and substantially axially through said body with the hook portion extending downwardly, and wings of relatively thin section formed integrally with said body and extending laterally therefrom, said buoyant body and wings being composed of a cellular thermoplastic polymer material with discrete non-communicating voids dispersed therethrough and of a weight of not more than 20 pounds per cubic foot, said body and wings having a relatively tough water-impervious skin forming the entire outer surface thereof and being integral with said underlying cellular material whereby said lure will remain buoyant although wetted and subjected to rough use.

References Cited in the file of this patent

UNITED STATES PATENTS

| | | |
|---|---|---|
| 1,834,277 | Haberl | Dec. 1, 1931 |
| 2,134,401 | Harvey | Oct. 25, 1938 |
| 2,277,790 | Sisco | Mar. 31, 1942 |
| 2,309,902 | Harvey | Feb. 2, 1943 |
| 2,511,117 | Loeb | June 13, 1950 |
| 2,643,418 | Auldridge | June 30, 1953 |
| 2,707,803 | Thorne | May 10, 1955 |
| 2,718,668 | Burke | Sept. 27, 1955 |
| 2,740,226 | Arff | Apr. 3, 1956 |
| 2,753,651 | Fisher | July 10, 1956 |
| 2,765,572 | Woolfe | Oct. 9, 1956 |
| 2,786,235 | Schieferstein | Mar. 26, 1957 |
| 2,898,634 | Alderfer | Aug. 11, 1959 |
| 2,948,020 | D'Ascoli | Aug. 9, 1960 |

FOREIGN PATENTS

| | | |
|---|---|---|
| 703,459 | Great Britain | Feb. 3, 1954 |